Jan. 18, 1966 H. GLADIEU 3,229,728

DEVICE FOR CONNECTING CIRCUIT WIRES TO CONNECTING LUGS

Filed June 11, 1962

INVENTOR
HENRI GLADIEU
BY Paul M. Craig Jr.
ATTORNEY

United States Patent Office 3,229,728

Patented Jan. 18, 1966

3,229,728
DEVICE FOR CONNECTING CIRCUIT WIRES TO CONNECTING LUGS

Henri Gladieu, Malakoff, France, assignor to CIT-Compagnie Industrielle des Telecommunications, Paris, France Filed June 11, 1962, Ser. No. 201,611
Claims priority, application France, June 15, 1961, 865,007
5 Claims. (Cl. 140—123)

The present invention concerns a device by means of which connecting wires can be readily positioned on the pins to which they are to be connected. Such a device is particularly applicable in the telecommunications, remote-control and signalling industries, and to computing machines and the like, in which the number of connections may be very large.

It is known that, in order to solder a circuit wire to a connecting lug, it is necessary first of all to proceed with a preparation which consists in baring the wire over a short length and then winding it with the aid of tongs on to the pin to which it is to be soldered.

It is also known that two methods are employed for performing an extensive wiring operation: either the so-called "wire-to-wire" method or the so-called "comb" method. The first method consists in passing the wires one by one and connecting them successively to the positioned members, while the second method consists in previously preparing on a table a "comb," that is to say, the set of wires, cut to the required length and tied together, each being positioned approximately opposite the pin to be connected.

The present invention has for its object to provide a device by which the circuit wires can be positioned and bared in the case of a "comb" wiring.

In the first method, since only one wire is available, it is easy to position the wire opposite the pin to which it is to be connected, to bring it to the required length, to advance the tool for directly positioning it on the pin to which it will be soldered, and then to cut the wire or to extend it, according to requirements.

The same is not the case with the second method, in which the wires are already cut and bunched together by small lateral tied strands extending from a thick longitudinal tied strand. In the latter case, it would be very inconvenient to proceed by positioning each wire directly opposite its pin, because, since the free section of the comb is of short length, the previously positioned neighbouring wires would be displaced if it were positioned opposite the connecting lug. Therefore, it is important that each wire should be positioned on its pin both accurately and gently so as to avoid any repercussion from one wire to another.

The present invention makes it possible to obviate these disadvantages.

The device according to the invention is characterised in that it comprises a partially flexible, fixed portion, and a movable portion sliding longitudinally in relation to the fixed portion, the fixed portion consisting of a metal strip terminated by a hook, of which the plane is at a right angle to that of the strip, the said hook being adapted to engage a circuit wire and the movable portion comprising the means necessary for guiding the sections of the circuit wire and baring them.

An essential feature of the invention consists in that the operation is carried out in two phases: in a first phase, the tool engages the wire to be connected and bares it and positions it on a false pin inside the tool; in a second phase, the tool is threaded on to the connecting lug itself, the latter expelling the false pin and taking its place. In particular, the bared circuit wire takes up a position at the base of the recess in the connecting lug. The tool is then withdrawn and the connecting lug appears with its circuit wire positioned and ready for soldering.

The tool according to the invention therefore comprises a false pin adapted to be retracted when the connecting lug is presented. Slidably mounted on the false pin is a movable member supporting the baring blade and formed with guide cavities to form the loop in the circuit wire.

Further features of the invention will become apparent in the course of the description. In addition, the invention will be readily understood from the following detailed description, which is given by way of example, of a constructional form of the device according to the invention, with reference to the accompanying drawings, in which.

Figures 1, 3, 6:
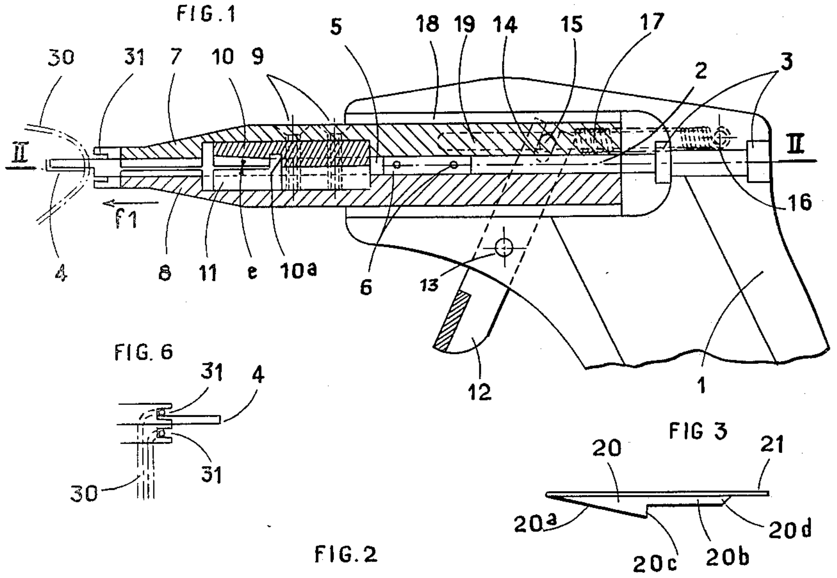
FIGURE 1 is an overall elevational and sectional view of the device according to the invention.
FIGURE 3 shows the details of the outline of the hook.
FIGURES 6 illustrates the details of the end of the tool.

The whole device is illustrated in FIGURE 1. It comprises two main parts: an operating handle 1, which is preferably in the form of a pistol butt, but which may obviously have any other form, and an assembly of the mechanism lodged in the butt or bearing against it. The mechanism in turn comprises a fixed part consisting of a rod 2, of which the bearing surfaces 3 prevent any longitudinal movement, and of a false pin 4, of which one section 5 is extended and secured at 6 to the rod 2. Slidably mounted on the rod 2 is a movable part consisting of two symmetrical shells 7 and 8 held together by screws. Secured to the upper shell 7 by the screws 9 is a baring unit composed of a blade 10 and a counter-blade 11. It will be noted that there is present over some length between the lower portion of the blade 10 and the upper portion of the counter-blade 11 a clearance whose width *e* corresponds to the thickness of a connecting lug. A U-shaped trigger 12 is rockably mounted on a pin 13. Each of the lateral arms of the trigger comprises in its upper portion a recess 14, into which there is introduced a bearing screw 15 fixed in the movable upper shell 7. Another bearing screw 16 is fixed in the butt 1 itself and a coil spring 17 is linked at one end to one of the screws 15 and at the other end to the screw 16. A guide jacket 18 formed of two symmetrical portions is fixed on the base 1 and serves as a guide to facilitate the movement of the movable members 7 and 8. Each of the portions 18 is formed with an oblong aperture 19 in which the screw 15 moves when driven by the trigger 12. Apertures identical to the said apertures 19 in the guide member are provided in exactly registering positions in the symmetrical members 1 of the handle.

Figure 2:
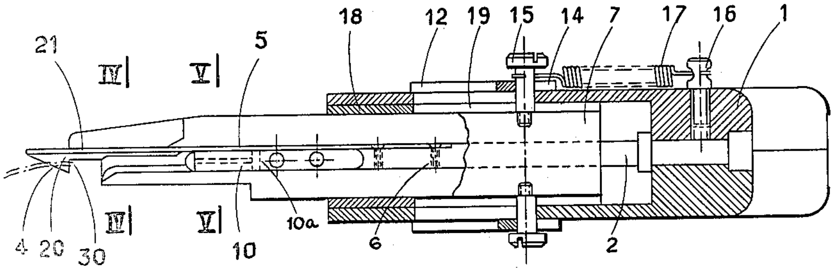
FIGURE 2 is an overall plan view, in section along the line II—II of the device of FIGURE 1.

FIGURE 2 is a plan view in section along the line II—II of FIGURE 1, in which the same references have been employed as in FIGURE 1. However, it is to be noted that the end of the false pin 4 in the fixed part of the tool is formed of two sections bent over at a right angle, one of which is in the form of a hook, of which the details are shown in FIGURE 3. The false pin 4 consists of a relatively long flexible strip 21, of which the end comprises a bill or hook 20 bent over at a right angle to the portion 21 (FIGURE 3). The hook 20 is composed of an acute-angled portion 20*a* and a narrowed portion 20*b*. The portion 20*a* is bounded by an edge 20*c* perpendicular to the section 21 and forming the engaging portion of the hook. The portion 20*b* adjoins the section 21 by way of an oblique intermediate portion 20*d*.

Figure 4:
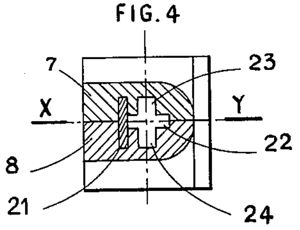
FIGURE 4 is a transverse sectional view along the line IV—IV of FIGURE 2, showing the wire-guiding cavities.

FIGURE 4 is a sectional view on a larger scale taken along the line IV—IV of the device of FIGURE 2 as seen in the direction of the butt. It will be noted that the upper shell 7 and the lower shell 8 are formed with cavities symmetrical about their assembly plane XY. Disposed in one of the cavities is the section 21 of the false pin, on which the members 7 and 8 are slidably mounted. The section 20 of the hook of the false pin 4 engages in the rectangular central cavity 22 perpendicular to 21. Finally, the cavities 23 and 24 are designed to enable the two lengths of the circuit wire to slide therein when it is engaged by the small side of the hook 20 and applied against either side of the section 20 of the false pin by the forward movement of the sliding members 7 and 8.

Figure 5:
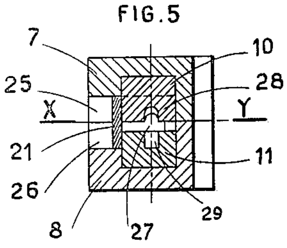
FIGURE 5 is a transverse sectional view along the line V—V of FIGURE 2, showing the blades.

FIGURE 5 is a sectional view similar to that of FIGURE 4, drawn to a larger scale than FIGURES 1 and 2, along the line V—V of the device of FIGURE 2 as seen in the direction of the butt. The upper shell 7 is formed with a lateral recess 25 and the lower shell 8 is formed with a symmetrical recess 26, the height of the two recesses 25 and 26 being slightly greater than the height of the section 21 of the false pin 4, so that the latter can move laterally in the said cavity. The blade 10 is let into the upper shell 7 and the counter-blade 11 is let into the lower shell 8. There exists between the lower edge of the blade 10 and the upper edge of the counter-blade 11 a clearance 27, of which the width corresponds to the thickness of the section 20 of the false pin 4. The tunnel 28 corresponds to the cutting portion of the blade and a recess 29 is provided for the lower length of the circuit wire. The circuit wire will therefore be bared only over a portion of its upper section.

The operation is as follows:

*First phase.*—The circuit wire is disposed on the edge 20*c* of the hook 20 of the false pin 4 as illustrated in FIGURE 1, in which the circuit wire is shown in dash-dotted lines below the reference 30. The trigger 12 of the tool is pressed and the screw 15 slides in the recess 19. The spring 17 is tensioned and the movable portion of the tool consisting of the members 7 and 8 slides between the guide members 18 and is carried forwards in the direction of the arrow $f_1$. However, the false pin 4, which is fast with the member 2, has not moved, because the said member 2 is connected to the butt of the tool by the let-in bearing pins 3. The two lengths of the wire 30 are flattened by the movement of the movable portion and enter the two cavities 23 and 24 (FIGURE 4), in which they are urged against either side of the section 20 of the false pin. As the movement of the members 7 and 8 continues, the cutting tunnel of the blade 10 arrives over the circuit wire 30, while the inner edge 10*a* of the blade abuts the inclined surface 20*d* of the section 20 of the false pin (FIGURE 3). The false pin is then gently urged outwards and is maintained in this position owing to the recessed portion 20*b*. Its lateral movement takes place in the recesses 25 and 26 (FIGURE 5). The upper length is bared over a certain distance and gripped against the portion 20 of the false pin owing to the rearward inclination of the profile of the tunnel. At this instant, the trigger is at the end of its stroke and it is maintained in this position. The two emerging lengths of the circuit wire 30 are then introduced into two recesses 31 situated one above the other at the end of the tip of the tool, and bent over at 90° as illustrated in FIGURE 6, so as to be well positioned in such manner that they can without difficulty be finally positioned on the connecting lug.

Figure 7:
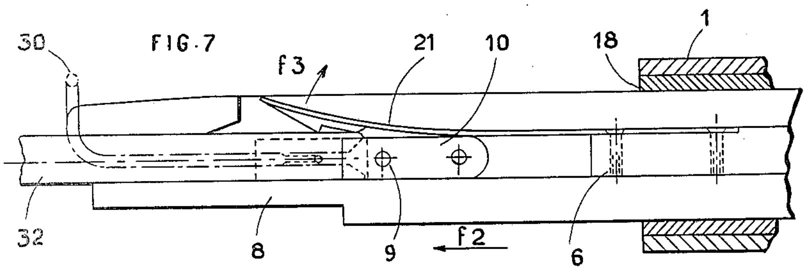
FIGURE 7 illustrates the false pin retractable by means of the connecting lug.

*Second phase.*—The tool, still in this position, is then presented to the connecting lug 32 on which it is to be positioned (FIGURE 7). The cavity, whose rectangular profile 22 (FIGURE 4) is that of the connecting lug, then slides on to the connecting lug itself with a forward movement of the whole tool (arrow $f_2$, FIGURE 7). The profile 20*a* of the false pin encounters the end of the connecting lug, which is narrowly guided in the rectangular passage 22, the false pin being laterally displaced a second time in the recess 25–26 in the direction of the arrow $f_3$, while the two lengths of circuit wire, which are retained in their position by the cavities 23 and 24 and by the tunnel 28, do not follow the lateral movement of the false pin and remain in position. The end of the connecting lug 32 gradually takes the place of the false pin and the circuit wire becomes positioned exactly on the base of the small recess in the connecting lug when the tool stops its forward movement. It merely remains to remove the tool assembly from the connecting lug by a rearward movement (in the direction opposite to $f_2$). The trigger is then allowed to return to its inoperative position.

It is obvious that the invention hereinbefore described is not limited to the example given and that variants thereof could be conceived in which the false pin is movable and the blade fixed, or the baring of the circuit wire is commenced only in the first operating phase, and is then completed during the final positioning on the connecting lug. The same is the case with regard to the general form of the tool and its operating handle.

I claim:

1. Device for connecting a large number of circuit wires in the form of a comb to a corresponding number of connecting lugs, said device effecting the baring of the wires and their rapid positioning on the lugs, and comprising a fixed, partially flexible portion, and a movable portion capable of sliding longitudinally on the fixed portion, the fixed portion including a flexible member consisting of a metal strip terminated by a hook whose plane is at a right angle to that of the strip, said hook being adapted to engage a circuit wire and the movable portion comprising means for guiding the lengths of circuit wire engaged by said hook and means associated with said guiding means for baring said lengths adjacent said hook, while the circuit wire is positioned on the hook by the forward movement of the movable portion, and means associated with said hook for camming said member to a position out of the path of said connecting lug upon insertion of the connecting lug into said movable member, the circuit wire remaining in position during camming of said flexible member and being automatically positioned on the connecting lug.

2. Device according to claim 1, wherein the movable portion comprises two assembled symmetrical shells, each of which is formed in its forward and central portion with internal longitudinal grooves for guiding the strip with its hook and the two lengths of circuit wire which are positioned on either side of the plane of the hook, the baring unit being situated within said grooved portion and between the two shells, a recess formed in said movable member lateral to said grooved portion level with the location of the strip to accommodate its bending movement, and the whole movable portion being actuated by a lever provided with a spring for returning it to the inoperative position.

3. Device according to claim 1, wherein the fixed portion consists of a flexible strip at the end of a rigid positioning rod in an operating handle, the hook by which the flexible strip is terminated having an outline which forms a cam surface such that the rear portion of the cam surface is acted on during insertion of said connecting lug in said movable member so as to substitute the connecting lug accurately for the hook, said strip bending in accordance with the profile of the cam surface.

4. Device according to claim 1, wherein the movable portion has a tip comprising two recesses situated level with the grooves for guiding the two lengths of circuit wire, as they enter said recesses and are bent over in such manner as to be positioned in their final location simultaneously with the completion of the positioning on the connecting lug.

5. Device according to claim 1, comprising in addition an operating handle in the form of a pistol butt and comprising a trigger forming a lever for controlling the movement of the movable portion.

References Cited by the Examiner

UNITED STATES PATENTS

| | | | |
|---|---|---|---|
| 2,779,356 | 1/1957 | Schluze | 140—93 |
| 2,828,780 | 4/1958 | Gray | 140—123 |
| 2,885,764 | 5/1959 | Shulters et al. | 81—9.5 |
| 2,955,624 | 10/1960 | Ferm | 140—123 |
| 3,022,805 | 2/1962 | Pilskar | 140—93 |

CHARLES W. LANHAM, *Primary Examiner.*

WILLIAM F. PURDY, *Examiner.*